United States Patent
Nishimura et al.

(10) Patent No.: US 8,043,083 B2
(45) Date of Patent: Oct. 25, 2011

(54) MOVABLE PLATEN SUPPORT MECHANISM

(75) Inventors: Koichi Nishimura, Yamanashi (JP);
Naruhiro Nishimura, Yamanashi (JP);
Masatoshi Senga, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/837,527

(22) Filed: Jul. 16, 2010

(65) Prior Publication Data

US 2011/0052749 A1    Mar. 3, 2011

(30) Foreign Application Priority Data

Sep. 2, 2009  (JP) ................................. 2009-202548

(51) Int. Cl.
*B29C 45/64* (2006.01)
(52) U.S. Cl. 425/190; 425/472; 425/589; 425/DIG. 127
(58) Field of Classification Search .................. 425/190, 425/192 R, 450.1, 472, 589, DIG. 127
See application file for complete search history.

(56) References Cited

U.S. PATENT DOCUMENTS

| | | | | |
|---|---|---|---|---|
| 4,948,358 A | * | 8/1990 | Kushibe et al. | 425/589 |
| 4,984,980 A | * | 1/1991 | Ueno | 425/595 |
| 5,249,951 A | * | 10/1993 | Leonhartsberger et al. | 425/589 |
| 5,297,952 A | * | 3/1994 | Leonhartsberger | 425/593 |
| 7,168,946 B2 | | 1/2007 | Koike et al. | |
| 2006/0228438 A1 | | 10/2006 | Koike et al. | |

FOREIGN PATENT DOCUMENTS

| | | |
|---|---|---|
| JP | 08-258103 A | 10/1996 |
| JP | 9262884 A | 10/1997 |
| JP | 2003-071894 A | 3/2003 |
| JP | 2004-330449 A | 11/2004 |
| JP | 2006-272558 A | 10/2006 |
| JP | 2006289738 A | 10/2006 |
| JP | 2007130940 A | 5/2007 |
| JP | 2010089295 A | 4/2010 |

OTHER PUBLICATIONS

German Office Action for DE 10 2010 035 790.1-16 dated Apr. 7, 2011.

* cited by examiner

*Primary Examiner* — James Mackey
(74) *Attorney, Agent, or Firm* — Lowe, Hauptman, Ham & Berner, LLP

(57) ABSTRACT

An injection molding machine is provided with a linear guide block configured to be guided on a linear guide rail and a guide mounting block which is secured to the linear guide block and supports the movable platen. Two mounting bolts and two adjust bolts are disposed individually at two positions, spanning between the movable platen and the guide mounting block. The size of a gap between the movable platen and the guide mounting block is adjusted by independently tightening the adjust bolts, whereby the horizontal tilt of the movable platen is adjusted.

2 Claims, 6 Drawing Sheets

MOVABLE PLATEN SUPPORT MECHANISM

RELATED APPLICATIONS

The present application is based on, and claims priority from, Japanese Application Number 2009-202548, filed Sep. 2, 2009, the disclosure of which is hereby incorporated by reference herein in its entirety.

BACKGROUND OF THE INVENTION

1. Field of the Invention

The present invention relates to a movable platen support mechanism used in an injection molding machine provided with a movable platen, stationary platen, rear platen, die clamping mechanism, and linear guide unit for axially guiding the movable platen.

2. Description of the Related Art

As shown in FIG. 11, an injection molding machine usually comprises a die clamping unit 100 and an injection unit 200, which are located on a base frame 300. The die clamping unit 100 includes a movable platen 1, stationary platen 9, rear platen 12, and toggle mechanism 13. A plurality of tie-bars 14 are mounted between the stationary platen 9 and the rear platen 12 so as to penetrate the movable platen 1. The tie-bars 14 are slidable relative to the movable platen 1. The stationary platen 9 is fitted with a stationary die (not shown), and the movable platen 1 with a movable die (not shown).

A pair of linear guide rails 11 are mounted on the base frame 300, and linear guide blocks 5 to which the guide mounting block 2 is secured are placed on the guide rails 11. The linear guide blocks 5 are movable longitudinally relative to the guide rails 11. The movable platen 1 is secured to the linear guide blocks 5 by bolts (not shown) or the like with the aid of the guide mounting block 2. The toggle mechanism 13 is powered by a movable platen driving servomotor (not shown). As the toggle mechanism 13 is driven, the movable platen 1 approaches or withdraws from the stationary platen 9. As the movable platen 1 moves in this manner, the linear guide blocks 5 move on the guide rails 11 longitudinally relative thereto. For example, Japanese Patent Application Laid-Open No. 9-262884 discloses a technique in which a linear guide is used to guide a movable platen in a die clamping mechanism of an injection molding machine, in order to improve the die opening/closing accuracy.

If the linear guide is used to guide the movable platen, as described above, a load produced by the deformation of the movable platen acts on the linear guide, thereby greatly affecting the life performance of the guide. Some of measures to counter this phenomenon are proposed in the following Japanese patent publications.

Japanese Patent Application Laid-Open No. 8-258103 discloses a platen structure that can suppress deflection.

Japanese Patent Application Laid-Open No. 2006-272558 discloses a technique in which an expensive material with a low linear expansion coefficient is used for a platen and a platen support member.

Japanese Patent Application Laid-Open No. 2003-71894 discloses a mechanism in which spring elements are vertically attached to the lower end portion of a movable platen, as a mechanism that can absorb deformation of the movable platen.

Japanese Patent Application Laid-Open No. 2004-330449 discloses a mechanism in which buffer members (spring elements or fluid-pressure cylinders) are arranged vertically and horizontally between a movable platen and a linear guide unit, as a mechanism that can absorb vertical and horizontal deformations of a movable platen.

If the linear guide is used to guide the movable platen, as mentioned before, a load produced by the deformation of the movable platen acts on the linear guide, so that the life performance of the guide is greatly affected. The deformation of the movable platen is attributable to deflection by a die clamping force and thermal expansion caused by die temperature control.

The deflection by the die clamping force can be reduced by the technique disclosed in Japanese Patent Application Laid-Open No. 8-258103.

Further, the thermal expansion due to die temperature control can be reduced by the technique disclosed in Japanese Patent Application Laid-Open No. 2006-272558. In this case, however, an expensive material with a low linear expansion coefficient needs to be used for a platen, such as a movable platen, and a platen support member, thus entailing an increase in the manufacturing cost of an injection molding machine.

According to the technique disclosed in Japanese Patent Application Laid-Open No. 2003-71894, the spring elements are mounted vertically, so that they cannot absorb horizontal deformation of the movable platen. Further, the spring elements are located between a guide mounting block and mounting bolts, so that the posture of the platen does not change if shims are fitted to bolt seating surfaces. Thus, this technique is not applicable to parallelism adjustment.

According to the technique disclosed in Japanese Patent Application Laid-Open No. 2004-330449, the buffer members are mounted vertically and horizontally, so that the posture of the movable platen is unstable and requires support by tie-bars. Thus, the effect of the linear guide unit to improve the die opening/closing accuracy is small. Since the adjustment of the parallelism of the platen is not taken into consideration, moreover, this technique is not applicable to the parallelism adjustment.

SUMMARY OF THE INVENTION

Accordingly, the object of the present invention, in consideration of these problems of the prior art techniques, is to provide a movable platen support mechanism of an injection molding machine, which comprises a linear guide unit for guiding the movement of a movable platen in a die closing direction, the movable platen support mechanism having a function to absorb deformation of the movable platen caused by thermal expansion and a function to adjust the horizontal tilt of the movable platen.

In order to achieve the above object, a first aspect of a movable platen support mechanism of an injection molding machine according to the present invention comprises a base frame, a stationary platen and a movable platen disposed on the base frame, a linear guide rail secured to the base frame, a linear guide block configured to be guided on the linear guide rail, a guide mounting block which is secured to the linear guide block and supports the movable platen, a spring element disposed between the movable platen and the guide mounting block, and a mounting bolt configured to compress the spring element, thereby elastically connecting the guide mounting block and the movable platen. The spring element and the mounting bolt are mounted on the guide mounting block at two or more separate positions longitudinally relative to the linear guide rail. The movable platen is configured to mesh with an adjust bolt which pulls the movable platen or the guide mounting block is configured to mesh with an adjust bolt which pushes the movable platen.

Further, a second aspect of the movable platen support mechanism of the injection molding machine according to the present invention comprises a base frame, a stationary platen and a movable platen disposed on the base frame, a linear guide rail secured to the base frame, a linear guide block configured to be guided on the linear guide rail, a guide mounting block which is secured to the linear guide block and supports the movable platen, a spring element disposed between the movable platen and the guide mounting block, and a mounting bolt configured to compress the spring element, thereby elastically connecting the guide mounting block and the movable platen. The spring element and the mounting bolt are mounted on the guide mounting block at two or more separate positions longitudinally relative to the linear guide rail. A head-side end portion of the mounting bolt is externally threaded so that the mounting bolt is configured to be tightened by means of an internally threaded adjust nut to elastically connect the movable platen to the guide mounting block.

According to the present invention, there may be provided a movable platen support mechanism of an injection molding machine, which comprises a linear guide unit for guiding the movement of a movable platen in a die closing direction, the movable platen support mechanism having a function to absorb deformation of the movable platen caused by thermal expansion and a function to adjust the horizontal tilt of the movable platen.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
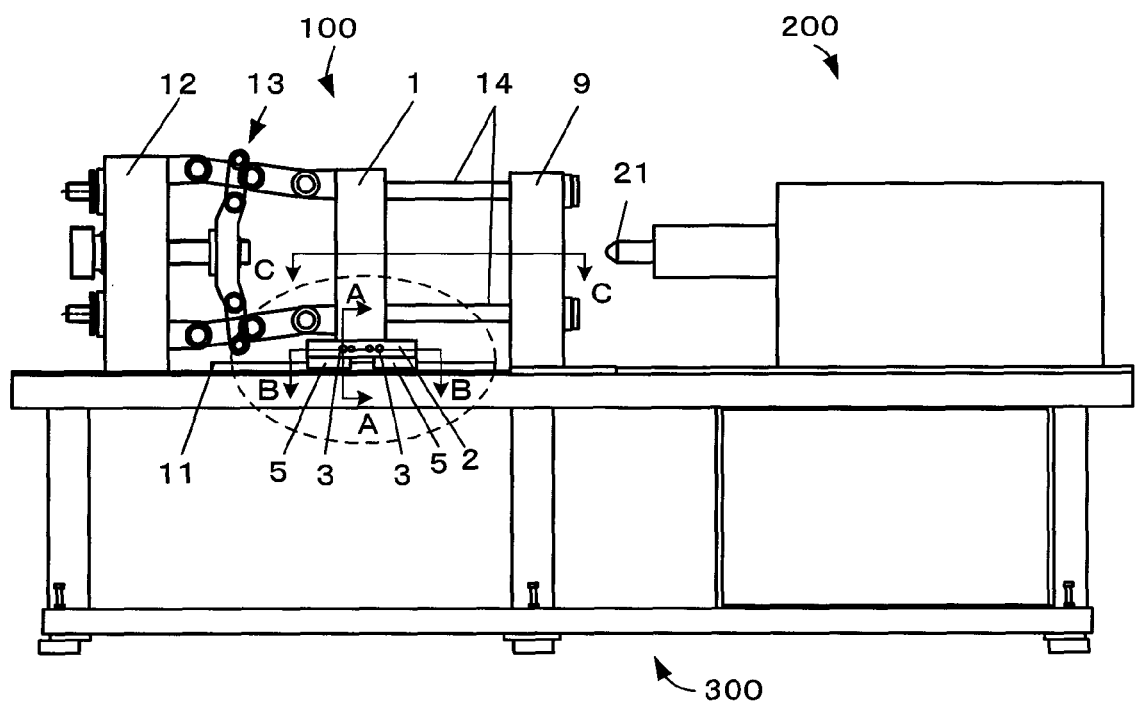
FIG. 1 is a view illustrating an example of an injection molding machine provided with a movable platen support mechanism according to one embodiment of the present invention.

FIG. 1 is a view illustrating an example of an injection molding machine provided with a movable platen support mechanism according to one embodiment of the present invention.

The injection molding machine comprises a die clamping unit 100 and an injection unit 200, which are located on a base frame 300. The die clamping unit 100 includes a movable platen 1, stationary platen 9, rear platen 12, and toggle mechanism 13. A plurality of tie-bars 14 are mounted between the stationary platen 9 and the rear platen 12. The stationary platen 9 is fitted with a stationary die (not shown), and the movable platen 1 with a movable die (not shown).

A pair of linear guide rails 11 are mounted on the base frame 300, and linear guide blocks 5 are placed on the guide rails 11. A guide mounting block 2 is secured to the linear guide blocks 5 by fixing female screws 7 (FIG. 2) and fixing bolts (not shown). The linear guide blocks 5 to which the guide mounting block 2 is secured are movable longitudinally relative to the guide rails 11. The movable platen 1 is secured to the linear guide blocks 5 by mounting bolts 3 with the aid of the guide mounting block 2.

The toggle mechanism 13 is driven by a movable platen driving servomotor (not shown). As the toggle mechanism 13 is driven, the movable platen 1 moves longitudinally relative to the linear guide rails 11 so as to approach or withdraw from the stationary platen 9. As the movable platen 1 moves in this manner, the linear guide blocks 5 move on the guide rails 11 longitudinally relative thereto.

First Embodiment

Figure 2:
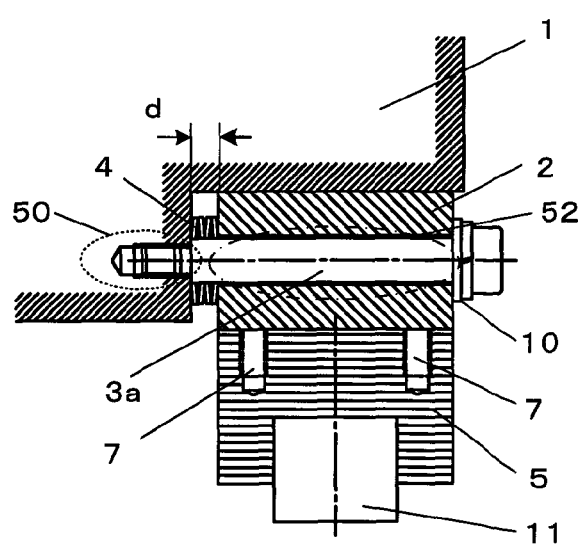
FIG. 2 is a sectional view of a part including a guide mounting block, linear guide blocks, and their surroundings, taken along arrow A-A of FIG. 1, the guide mounting block and the linear guide blocks being assumed to be identical to those of a first embodiment.
Figure 3:
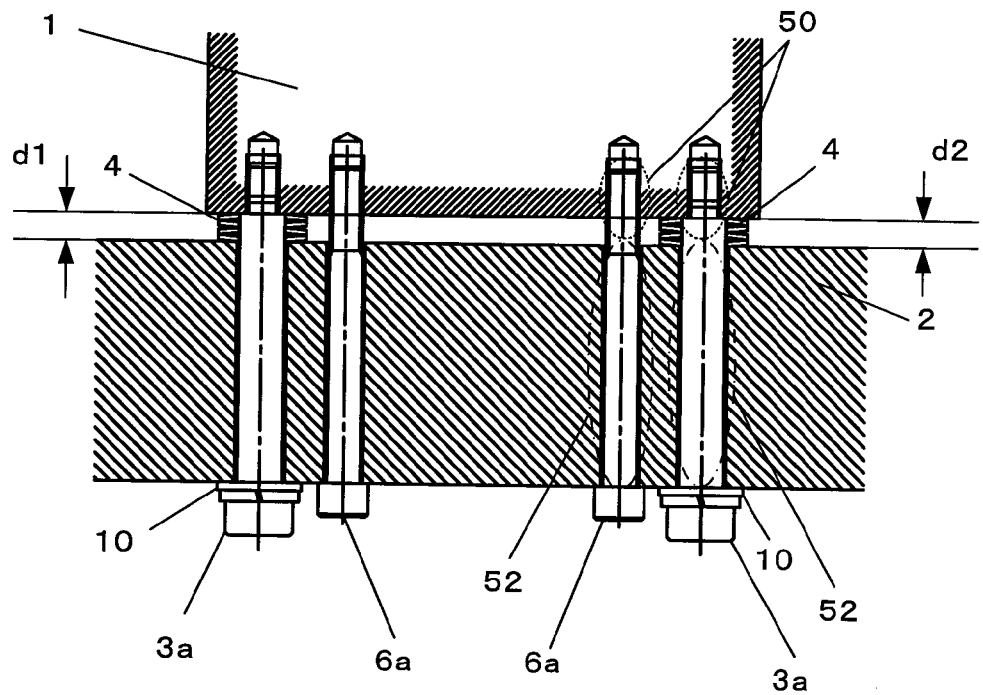
FIG. 3 is a sectional view of the part including the guide mounting block, the linear guide blocks, and their surroundings, taken along arrow B-B of FIG. 1, the guide mounting block and the linear guide blocks being assumed to be identical to those of the first embodiment.

Referring now to FIGS. 2 and 3, there will be described a first embodiment of a movable platen support mechanism according to the present invention, in which a movable platen 1 is supported by a guide mounting block 2. FIG. 2 is a sectional view of a part including the guide mounting block 2, the linear guide blocks 5, and their surroundings, taken along arrow A-A of FIG. 1. The guide mounting block 2 and the linear guide blocks 5 of FIG. 1 are assumed to be identical to those of the first embodiment.

The linear guide blocks 5 are placed on the linear guide rails 11, which are mounted on the base frame 300 (FIG. 1), so as to be movable longitudinally relative to the guide rails 11 (or at right angles to the drawing plane of FIG. 2). The guide mounting block 2 is secured to the linear guide blocks 5 by the fixing female screws 7 and the fixing bolts (not shown). The guide mounting block 2 is provided with a through-hole through which a first mounting bolt 3a is passed.

The first mounting bolt 3a is fitted in the through-hole in the guide mounting block 2. Further, a spring element 4 is fitted on the tip portion of the first mounting bolt 3a that projects outward from the guide mounting block 2. An external thread portion formed on the tip portion of the first mounting bolt 3a is screwed into an internal thread portion of the movable platen 1. Specifically, an external thread is formed on that part of the first mounting bolt 3a which is indicated by a broken-line ellipse 50 in FIG. 2, while an internal thread is formed on its corresponding part of the movable platen 1.

The movable platen 1 and the guide mounting block 2 are located with a horizontal gap d between them, and the movable platen 1 is supported by the guide mounting block 2. The gap d is a generic term for the gap between the movable platen 1 and the guide mounting block 2. The spring element 4 is compressed by the entwisted first mounting bolt 3a, whereby the movable platen 1 and the guide mounting block 2 are elastically connected to each other.

Neither the inner peripheral surface of the through-hole in the guide mounting block 2 nor the whole outer peripheral surface (indicated by a dash-dotted-line ellipse 52) of the first mounting bolt 3a except its tip portion, located in the through-hole, is threaded. If the movable platen 1 moves toward the axis of the first mounting bolt 3a against the elasticity of the spring element 4, therefore, the bolt 3a also moves together with the movable platen 1 in the same direction (or in the axial direction of the bolt 3a).

FIG. 3 is a sectional view of the part including the guide mounting block 2, the linear guide blocks 5, and their surroundings, taken along arrow B-B of FIG. 1. The guide mounting block 2 and the linear guide blocks 5 of FIG. 1 are assumed to be identical to those of the first embodiment.

While the guide mounting block 2 extends long at right angles to the axis of the first mounting bolt 3a (in the horizontal direction in FIG. 3), only a part of it is shown in FIG. 3. The guide mounting block 2 is formed with horizontally parallel through-holes through which two first mounting bolts 3a and two first adjust bolts 6a are passed.

Figure 4:
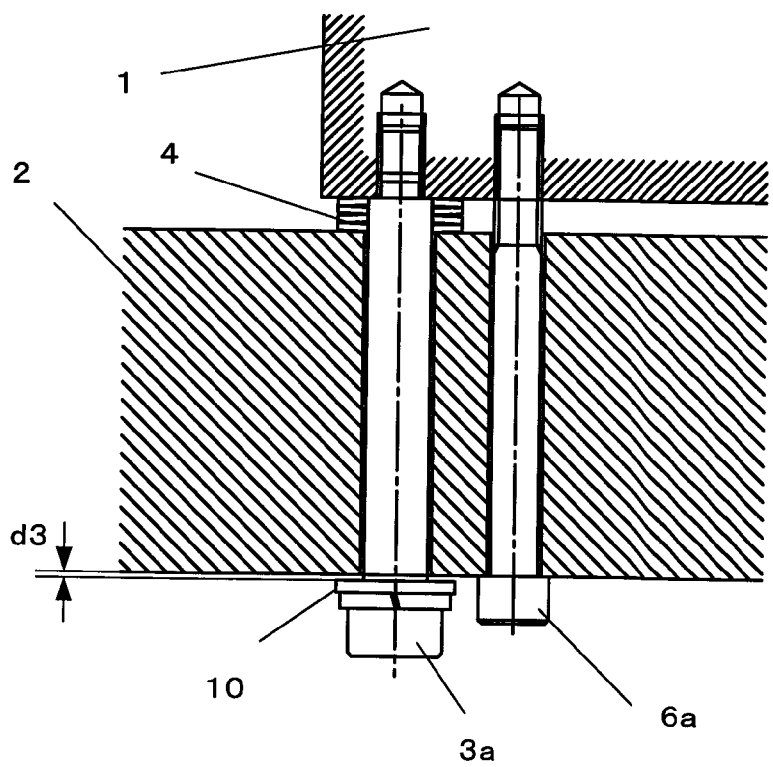
FIG. 4 is a view illustrating shim adjustment for a mounting bolt.
Figure 10:
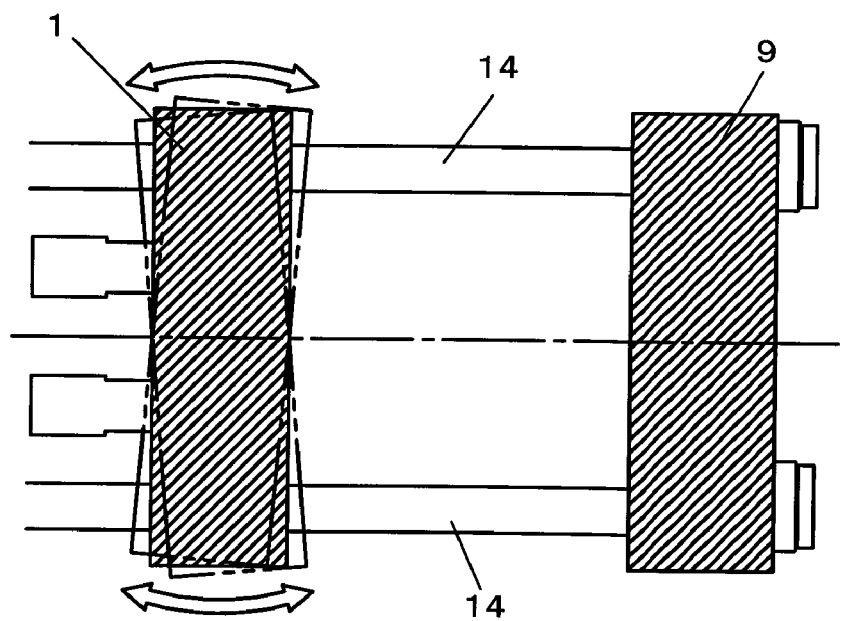
FIG. 10 is a sectional view taken along arrow C-C of FIG. 1.
Figure 11:
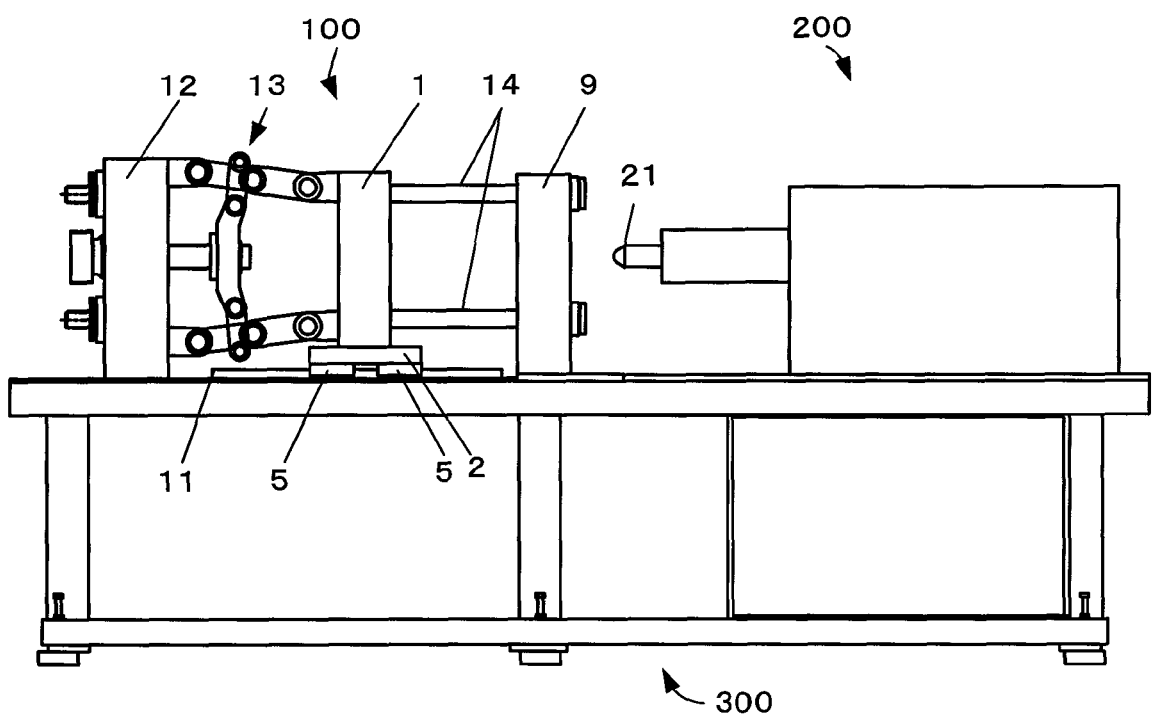
FIG. 11 is a view illustrating a conventional injection molding machine provided with a die clamping unit and an injection unit.

Each first adjust bolt 6a, like each first mounting bolt 3a, has an external thread formed on its tip portion, while an internal thread is formed on a corresponding portion of the movable platen 1. The external thread on the tip portion of the first adjust bolt 6a can be screwed into the internal thread of the movable platen 1. Thus, the gap between the movable platen 1 and the guide mounting block 2 can be adjusted by adjusting the amount of tightening of the first adjust bolt 6a. More specifically, a gap d1 between the guide mounting block 2 and the movable platen 1 at the left-hand one of two longitudinally separate points on each guide rail 11 and a gap d2 between the guide mounting block 2 and the movable platen 1 at the right-hand point can be adjusted independently of each other. The amounts of adjustment d1 and d2 may be differentiated from each other. In other words, a gap d3 may be formed between the seating surface of each first mounting bolt 3a and the guide mounting block 2, as shown in FIG. 4, by turning each first adjust bolt 6a to pull the movable platen 1 toward the guide mounting block 2. In this case, a shim 10 can be inserted into or removed from the gap d3. The horizontal tilt of the movable platen 1 (FIG. 10) can be adjusted by adjusting the thickness of the shim 10 at two or more separate positions longitudinally relative to each linear guide rail 11, thereby changing the distance (d1 or d2) between the movable platen 1 and the guide mounting block 2.

After the adjustment of the gap (d1 or d2) between the movable platen 1 and the guide mounting block 2 by means of the first adjust bolts 6a is finished, the bolts 6a may be removed from the guide mounting block 2 and stored in a tool storage area. Alternatively, the bolts 6a may be previously loosened in the movable platen 1. By doing this, the first adjust bolts 6a can be prevented from being excessively loaded if the movable platen 1 is deformed.

According to the present embodiment constructed in this manner, deformation of the movable platen 1 due to thermal expansion can be absorbed, and the horizontal parallelism of the movable platen 1 to the stationary platen 9 can be adjusted.

Second Embodiment

Figure 5:
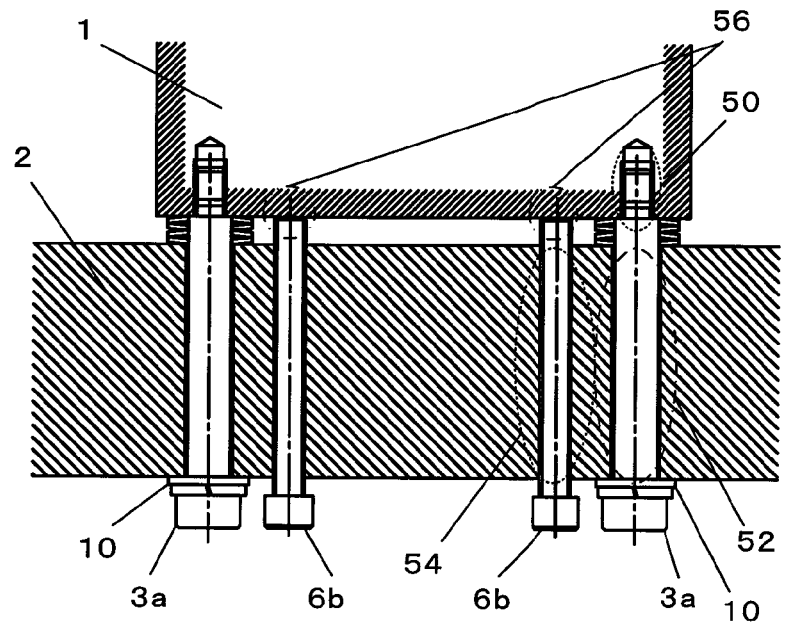
FIG. 5 is a sectional view of the part including the guide mounting block, the linear guide blocks, and their surroundings, taken along arrow B-B of FIG. 1, the guide mounting block and the linear guide blocks being assumed to be identical to those of a second embodiment.

Referring now to the sectional view of FIG. 5, there will be described a second embodiment of the movable platen support mechanism according to the present invention, in which the movable platen 1 is supported by the guide mounting block 2. FIG. 5 is a sectional view of the guide mounting block and the linear guide blocks based on this embodiment, taken along arrow B-B of FIG. 1. A sectional view taken along arrow A-A is the same as the one shown in FIG. 2.

This embodiment differs from the first embodiment in the configuration of adjust bolts. Each of second adjust bolts 6b used in this embodiment has an external thread on its side surface, and the through-hole of the guide mounting block 2 is formed with an internal thread. The extrusion of the movable platen 1 toward the guide mounting block 2 can be adjusted by adjusting the amount of projection of the tip portion of the second adjust bolt 6b from the guide mounting block 2.

As mentioned before, the guide mounting block 2 shown in FIG. 5 is placed on one of a pair of linear guide rails 11 by means of linear guide blocks 5. Further, a guide mounting block 2 (not shown in FIG. 5) of the same configuration is placed on the other linear guide rail 11 by means of linear guide blocks 5. The guide mounting block 2 not shown in FIG. 5, like the one shown in FIG. 5, is configured so that a pair of first mounting bolts 3a and a pair of second adjust bolts 6b are arranged facing its surface opposite from the movable platen 1.

If the second adjust bolts 6b arranged on the guide mounting block 2 are tightened to press the movable platen 1, therefore, the movable platen 1 moves toward the guide mounting block 2 shown in FIG. 5. Consequently, a gap is formed between the seating surface of each first mounting bolt 3a shown in FIG. 5 and the guide mounting block 2, as shown in FIG. 4, so that a shim 10 can be inserted into or removed from the gap. The horizontal tilt of the movable platen 1 (FIG. 10) can be adjusted by adjusting the thickness of the shim 10 at two or more separate positions longitudinally relative to each linear guide rail, thereby changing the distance (d1 or d2) between the movable platen 1 and the guide mounting block 2.

After the adjustment of the gap (d1 or d2) between the movable platen 1 and the guide mounting block 2 by means of the second adjust bolts 6b is finished, the bolts 6b may be removed from the guide mounting block 2 and stored in a tool storage area. Alternatively, the bolts 6b may be previously loosened in the guide mounting block 2. By doing this, the second adjust bolts 6b can be prevented from being excessively loaded if the movable platen 1 is deformed.

According to the present embodiment constructed in this manner, deformation of the movable platen 1 due to thermal expansion can be absorbed, and the horizontal parallelism of the movable platen 1 to a stationary platen 9 can be adjusted.

Third Embodiment

Figure 6:
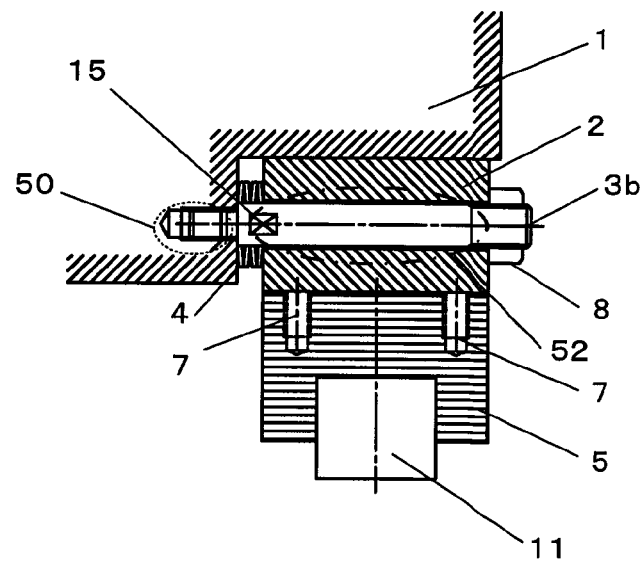
FIG. 6 is a sectional view of the part including the guide mounting block, the linear guide blocks, and their surroundings, taken along arrow A-A of FIG. 1, the guide mounting block and the linear guide blocks being assumed to be identical to those of a third embodiment.
Figure 7:
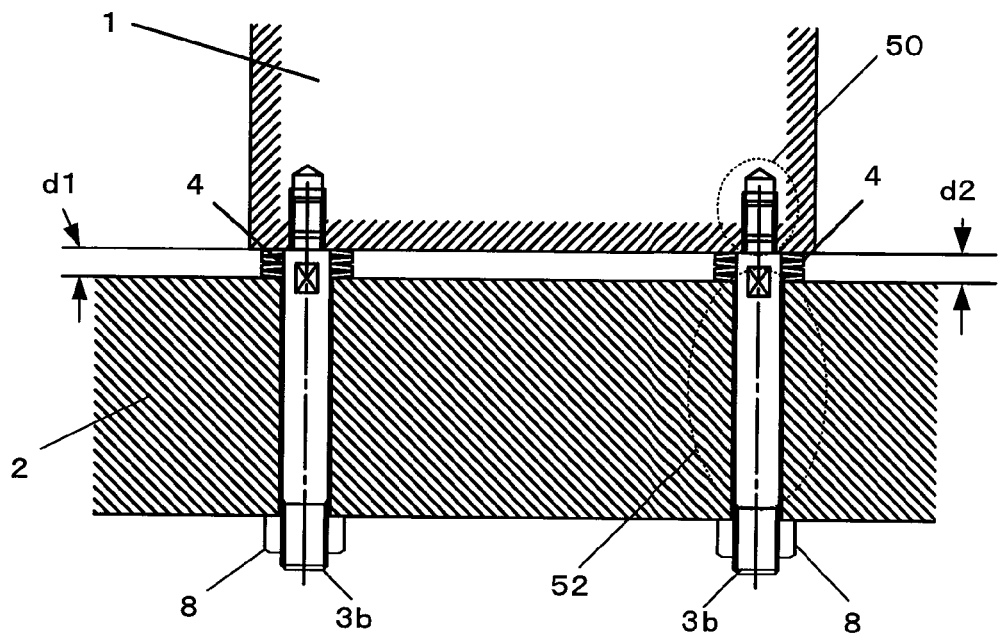
FIG. 7 is a sectional view of the part including the guide mounting block, the linear guide blocks, and their surroundings, taken along arrow B-B of FIG. 1, the guide mounting block and the linear guide blocks being assumed to be identical to those of the third embodiment.

Referring now to FIGS. 6 and 7, there will be described a third embodiment of the movable platen support mechanism according to the present invention, in which the movable platen 1 is supported by the guide mounting block 2. In this embodiment, adjust nuts are used in place of the adjust bolts.

An external thread is formed on the tip portion (indicated by a broken-line ellipse 50 in FIG. 6) of each of second mounting bolts 3b. The tip portion of each second mounting bolt 3b is screwed into an internally threaded hole in the movable platen 1. Further, an external thread is also formed on the head side of each second mounting bolt 3b, and an adjust nut 8 engages with the head-side external thread portion. No thread is formed in that part (indicated by a dash-dotted-line ellipse 52) of each second mounting bolt 3b which is fitted in a through-hole formed in the guide mounting block 2. Thus, the second mounting bolts 3b axially move together with the movable platen 1 if they are subjected to an axial force (in the horizontal direction in FIG. 6).

In FIG. 6, reference numeral 15 denotes a chamfered portion that is used in screwing the second mounting bolts 3b into the movable platen 1 by means of a tightening tool (not shown), such as a wrench.

FIG. 7 is a sectional view of the guide mounting block and the linear guide blocks based on this embodiment, taken along arrow B-B of FIG. 1. As shown in FIG. 7, none of the adjust bolts 6, 6a and 6b are used in this embodiment. According to this embodiment, the size of a gap d1 or d2 between the movable platen 1 and the guide mounting block 2 can be changed by adjusting the amount of tightening of the adjust nuts 8 that engage with the second mounting bolts 3b, individually.

According to the present embodiment constructed in this manner, deformation of the movable platen 1 due to thermal expansion can be absorbed, and the horizontal parallelism of the movable platen 1 to a stationary platen 9 can be adjusted.

Fourth Embodiment

Figure 8:
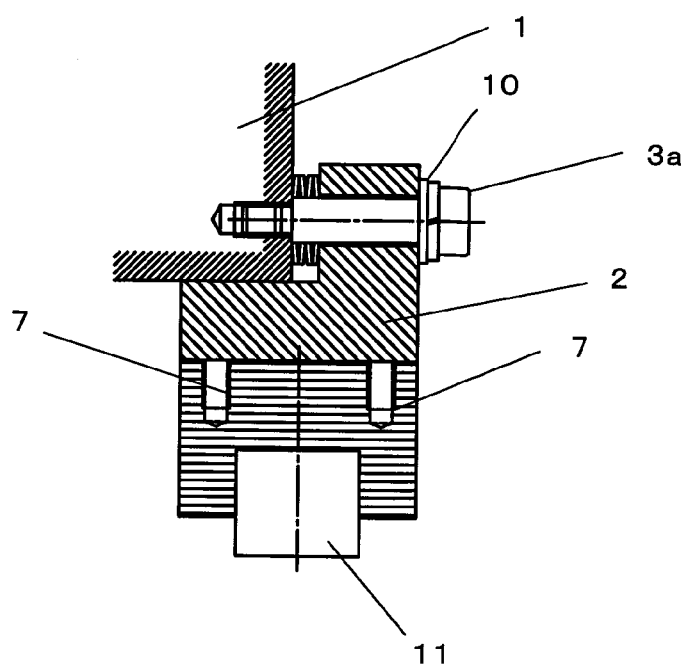
FIG. 8 is a sectional view of the part including the guide mounting block, the linear guide blocks, and their surroundings, taken along arrow A-A of FIG. 1, the guide mounting block and the linear guide blocks being assumed to be identical to those of a fourth embodiment.

Referring now to FIG. 8, there will be described a fourth embodiment of the movable platen support mechanism according to the present invention, in which the movable platen 1 is supported by the guide mounting block 2. FIG. 8 is a sectional view of the guide mounting block and the linear guide blocks based on this embodiment, taken along arrow A-A of FIG. 1.

This embodiment is characterized in that the guide mounting block 2 is a structure with an L-shaped cross section. According to this embodiment, deformation of the movable platen 1 due to thermal expansion can be absorbed, and the horizontal parallelism of the movable platen 1 to a stationary platen 9 can be adjusted.

Fifth Embodiment

Figure 9:
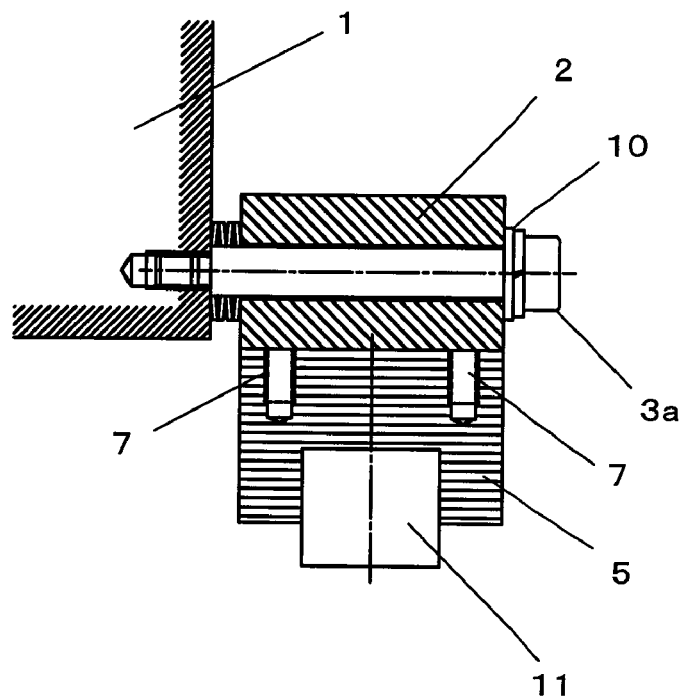
FIG. 9 is a sectional view of the part including the guide mounting block, the linear guide blocks, and their surroundings, taken along arrow A-A of FIG. 1, the guide mounting block and the linear guide blocks being assumed to be identical to those of a fifth embodiment.

Referring now to FIG. 9, there will be described a fifth embodiment of the movable platen support mechanism according to the present invention, in which the movable platen 1 is supported by the guide mounting block 2. FIG. 9 is a sectional view of the guide mounting block and the linear guide blocks based on this embodiment, taken along arrow A-A of FIG. 1.

This embodiment is characterized in that the load of the movable platen 1 is received by mounting bolts 3 and adjust bolts 6. According to this embodiment, deformation of the movable platen 1 due to thermal expansion can be absorbed, and the horizontal parallelism of the movable platen 1 to a stationary platen 9 can be adjusted.

In the first, second, fourth, and fifth embodiments described above, the gap d3 is formed between the seating surface of each first mounting bolt 3a (whose tip portion is screwed into the movable platen 1) and the guide mounting block 2, as shown in FIG. 4, by turning each adjust bolt 6a or 6b to push or pull the movable platen 1, so that the shim 10 can be inserted into or removed from the gap. The horizontal tilt of the movable platen 1 (FIG. 10) is adjusted by adjusting the thickness of the shims 10 at two or more separate positions longitudinally relative to each linear guide rail and changing the distance (d1 or d2 in FIG. 3) between the movable platen 1 and the guide mounting block 2.

On completion of the adjustment of the horizontal tilt of the movable platen 1 by means of the first or second adjust bolts 6a or 6b, according to these embodiments, the adjust bolts may be removed from the guide mounting block 2 or may be previously loosened to such a degree as not to affect a continuous injection molding operation by the injection molding machine. By doing this, the adjust bolts 6a or 6b can be prevented from unexpectedly interfering with the movable platen 1 or the guide mounting block 2. Further, the first or second adjust bolts 6a or 6b can be attached to or detached from a side surface of the injection molding machine, so that the parallelism of the movable platen 1 to the stationary platen 9 can be easily adjusted.

According to the third embodiment described before, the horizontal tilt of the movable platen 1 can be adjusted in such a manner that the gaps d1 and d2 shown in FIG. 7 are adjusted by adjusting the amount of tightening of adjust nuts 8. According to this embodiment, in which no shims are used, anti-loosening nuts should only be additionally used after the completion of the tilt adjustment.

The vertical tilt of the movable platen 1 can be adjusted by, for example, inserting shims into gaps between the guide mounting block 2 and the linear guide blocks 5.

What is claimed is:

1. A movable platen support mechanism of an injection molding machine, wherein the injection molding machine has an injection unit and a die clamping unit including a stationary platen to be fitted with a stationary die and a movable platen to be fitted with a movable die, disposed on a base frame, and also has a guide mounting block which is secured to a linear guide block and supports the movable platen and a linear guide rail which guides the linear guide block, said movable platen support mechanism comprising:
   a spring element horizontally disposed between the movable platen and the guide mounting block; and
   a mounting bolt configured to compress the spring element, thereby elastically connecting the guide mounting block and the movable platen, wherein
   the spring element and the mounting bolt are mounted on the guide mounting block at two or more separate positions longitudinally relative to the linear guide rail, and the movable platen is configured to mesh with an adjust bolt which pulls the movable platen toward the guide mounting block to narrow the space between the movable platen and the guide mounting block, or the guide mounting block is configured to mesh with an adjust bolt which pushes the movable platen from the guide mounting block to widen the space between the movable platen and the guide mounting block.

2. A movable platen support mechanism of an injection molding machine, wherein the injection molding machine has an injection unit and a die clamping unit including a stationary platen to be fitted with a stationary die and a movable platen to be fitted with a movable die, disposed on a base frame, and also has a guide mounting block which is secured to a linear guide block and supports the movable platen and a linear guide rail which guides the linear guide block, said movable platen support mechanism comprising:

a spring element horizontally disposed between the movable platen and the guide mounting block; and a mounting bolt configured to compress the spring element, thereby elastically connecting the guide mounting block and the movable platen, wherein the spring element and the mounting bolt are mounted on the guide mounting block at two or more separate positions longitudinally relative to the linear guide rail, and a head-side end portion of the mounting bolt is externally threaded so that the mounting bolt is configured to be tightened by means of an internally threaded adjust nut to elastically connect the movable platen to the guide mounting block.

* * * * *